No. 632,990. Patented Sept. 12, 1899.
B. F. DUNHAM.
SKIVING MACHINE.
(Application filed Aug. 16, 1898.)
(No Model.) 3 Sheets—Sheet 1.

Witnesses:
H. B. Davis.
Arthur H. Randall.

Inventor:
B. F. Dunham.
By Crossley and Goddard,
Attys.

No. 632,990. Patented Sept. 12, 1899.
B. F. DUNHAM.
SKIVING MACHINE.
(Application filed Aug. 16, 1898.)
(No Model.) 3 Sheets—Sheet 2.

Witnesses:
H. B. Davis.
Arthur J. Randall.

Inventor:
B. F. Dunham,
Crossley and Goddard,
Attys.

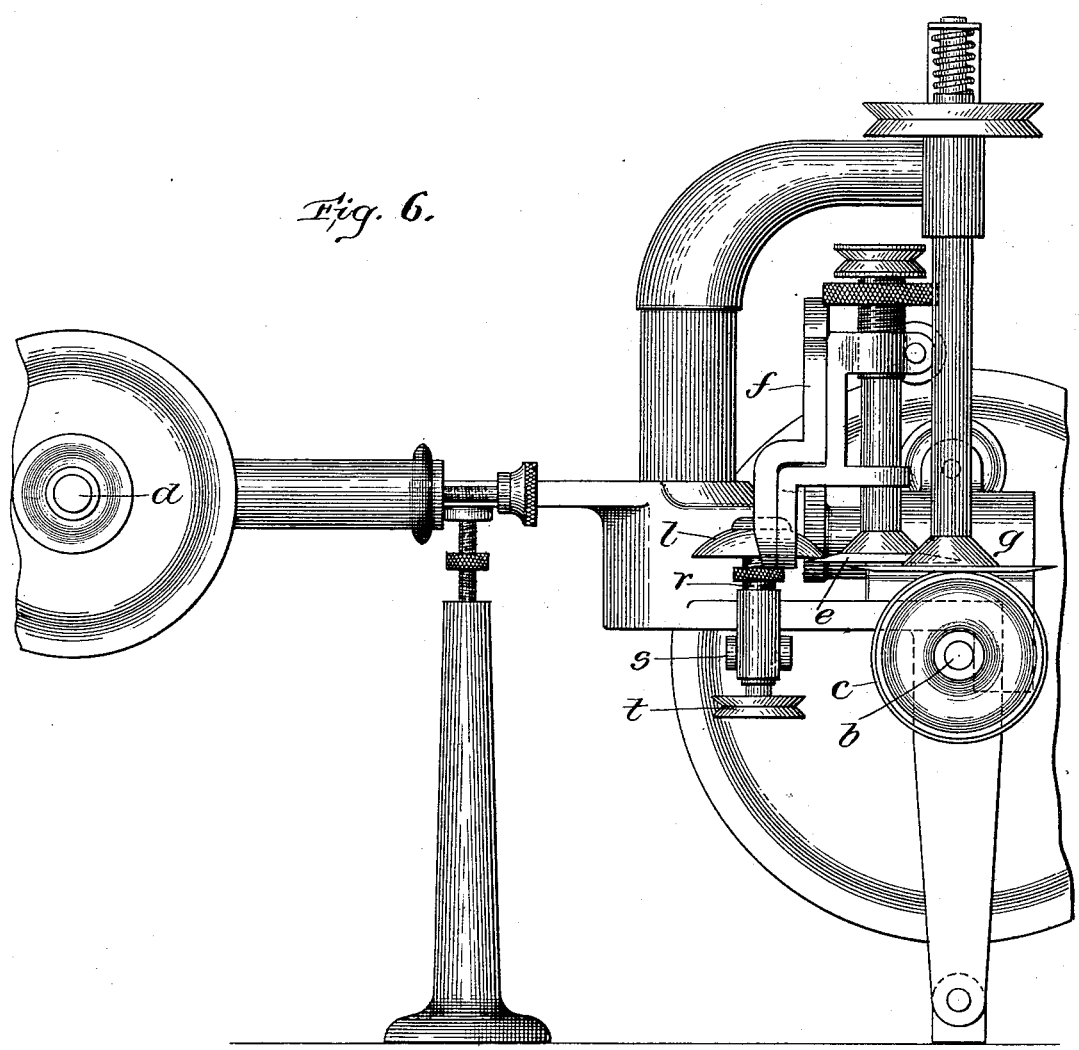

UNITED STATES PATENT OFFICE.

BENJAMIN F. DUNHAM, OF BROCKTON, MASSACHUSETTS, ASSIGNOR TO THE AMAZEEN MACHINE COMPANY, OF BOSTON, MASSACHUSETTS.

SKIVING-MACHINE.

SPECIFICATION forming part of Letters Patent No. 632,990, dated September 12, 1899.

Application filed August 16, 1898. Serial No. 688,702. (No model.)

*To all whom it may concern:*

Be it known that I, BENJAMIN F. DUNHAM, of Brockton, in the county of Plymouth and State of Massachusetts, have invented certain new and useful Improvements in Skiving-Machines, of which the following is a description sufficiently full, clear, and exact to enable those skilled in the art to which it appertains or with which it is most nearly connected to make and use the same.

This invention has relation to that kind of skiving-machines in which a rotary knife and a rotary feed-roll are employed and which are particularly adapted to skiving upper-leather.

Experience with the class of machines mentioned has demonstrated, among other things, that it is desirable, and, indeed, essential, when perfect work is to be done, that the rotary knife-support should be equipped with means whereby its tip or inclination can be easily and readily adjusted with nicety or exactness by persons of quite ordinary skill, and that the rise and fall of the presser-finger, in the performance of work on the machine, should be on a line parallel with the surface of the feed-roll, and also that a grinder for the knife, connected with the knife, should be provided, so that the knife when it becomes dull may be readily sharpened by the operator. It is the object of my invention to provide improved means for accomplishing these ends, all as I will now proceed to describe and claim.

Reference is to be had to the annexed drawings and to the letters marked thereon, forming a part of this specification, the same letters designating the same parts or features, as the case may be, wherever they occur.

Figure 1:
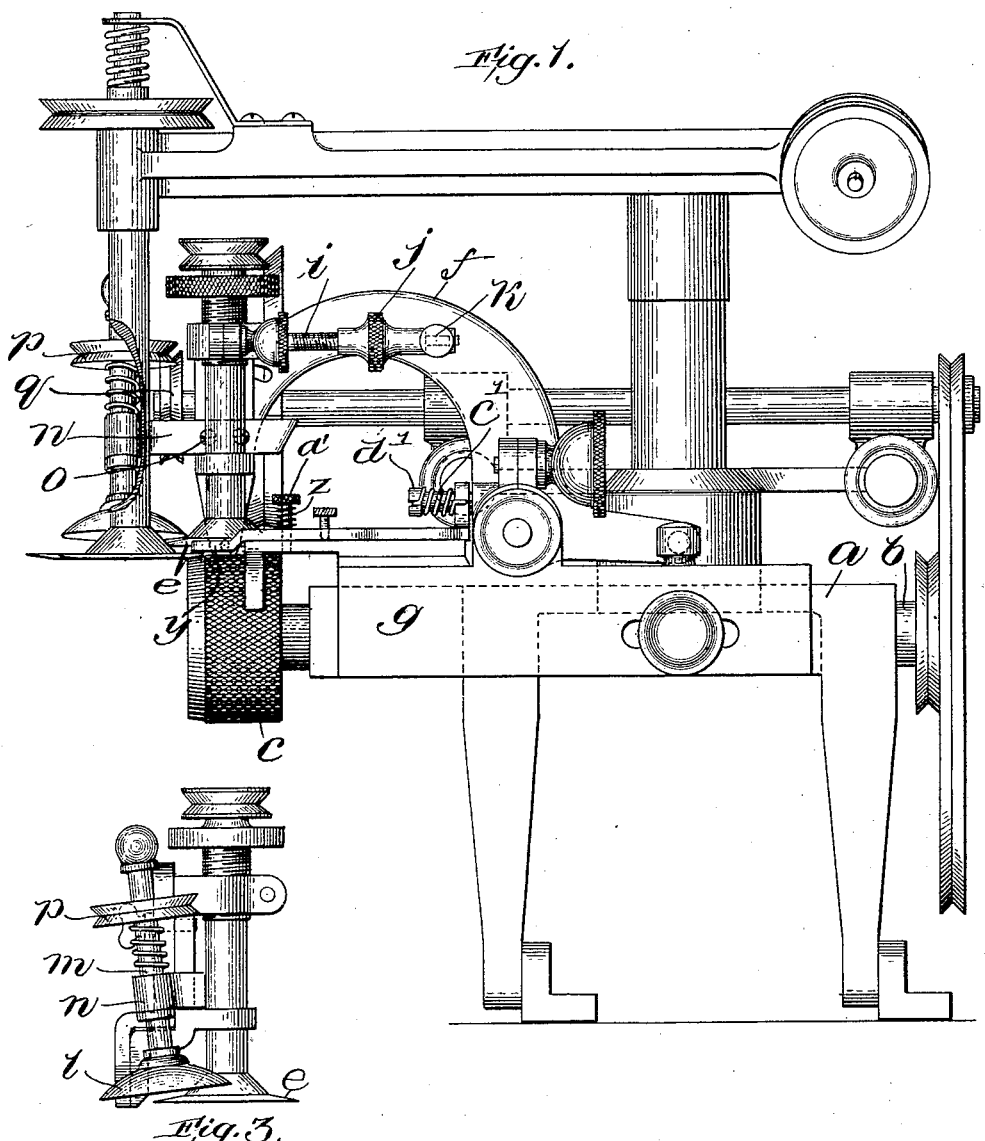
Figure 2:
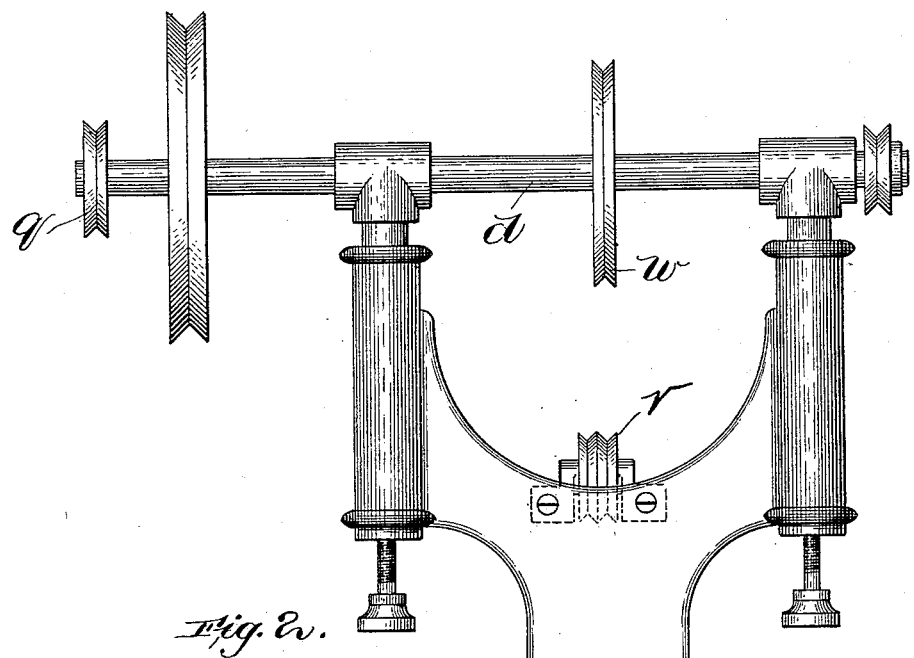
Figure 5:
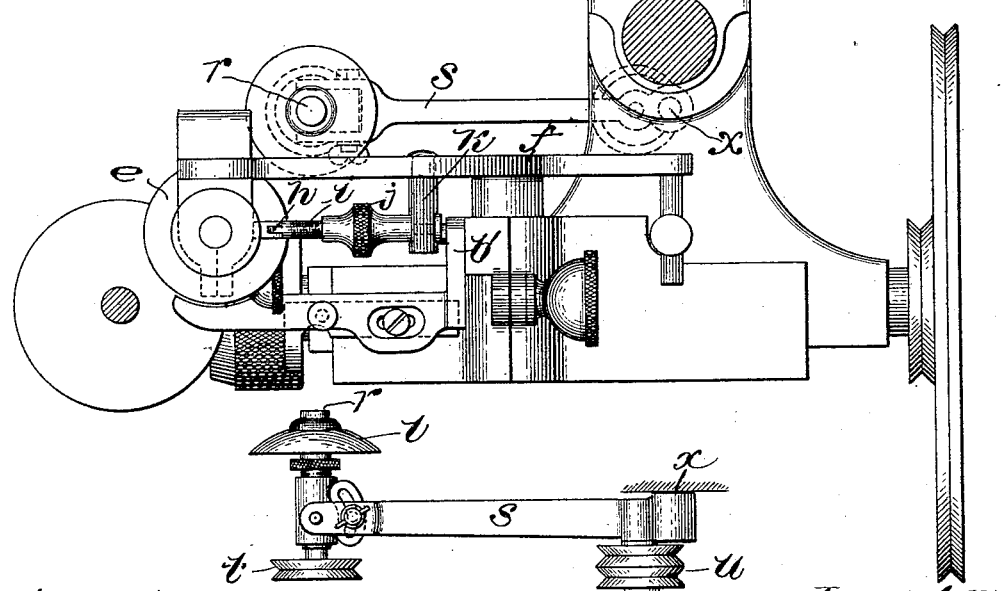

Of the drawings, Figure 1 is a front elevation, parts being represented as broken away, of a leather-skiving machine embodying my invention. Fig. 2 is a sectional plan view of the machine shown in Fig. 1, but showing a different form of grinder from that represented in said Fig. 1. Fig. 3 is an end view of the knife or cutter and grinder and their supports and the immediate connections of the same. Fig. 4 is a sectional detail plan view of the improved means for adjusting the tip or inclination of the knife. Fig. 5 is a side view of detached modified parts relating to the grinding means. Fig. 6 is a side view of Fig. 2, illustrating the relationship of the grinder to the knife, but not showing the grinder-operating means further than the pulley on the lower end of the rotary grinder stud or shaft.

My improvements have been wrought upon that type of leather-skiving machines commonly known among shoemaking artisans as the "Amazeen" skiving-machine, and particularly upon the form of the Amazeen machine as heretofore modified by me, as shown in United States Letters Patent granted to me July 13, 1897, so that the parts which have no modifying effect upon and are not directly connected with my improvements need not be explained in detail as to their construction and mode of operation.

In the drawings, $a$ designates the bed of the machine, suitably supported and itself supporting the framework of the machine.

$b$ is the feed-roll shaft, (which is also the main driving-shaft,) and $c$ is the feed-roll.

$d$ is the counter-shaft, the journals of which are supported by spring-pressed means to keep taut the belts (not shown) on the pulleys.

$e$ is the rotary knife or cutter, supported in or by means which are pivoted to the lower forward end of the overhanging arm $f$ of the sliding frame $g$, the pivoting-point being in the cutting-plane of the knife and on a line running directly rearward through its axis.

Hinged or pivoted to the knife-shaft support near its upper end, as at $h$, (see Figs. 2 and 4,) is a short rod $i$, the outer end of which is screw-threaded and is tapped into the thumb-nut $j$, having a rotary bearing in a stud $k$, projecting from the overhanging arm $f$. With this construction by the turning of the nut $j$ it will be seen that the knife-shaft and its support and the knife carried by the shaft may be tilted in one direction or the other with respect to the surface of the feed-roll so as to vary the inclination of the cut, as may be desired, and that this adjustment of the knife may be effected by ordinarily-skilled mechanics with great nicety and exactness. The adjustment of the knife, as described, is necessary in order to effect a cut parallel with the face of the feed-roll c or at a less or greater angle thereto in order that a stunted, inclined, or straight scarf may be made.

l designates the grinder, consisting of a disk of emery or other suitable material mounted on the lower end of a rotary shaft m, which is supported in bearings connected with the knife-shaft support, so that when once the grinder is adjusted to proper position relatively to the knife it will retain that adjustment however the knife may be adjusted—that is to say, the knife and grinder will be adjusted in unison so far as such adjustment may relate to their inclination. This is important, since all that is necessary when the knife is to be ground is to set the grinder down into contact with the knife and put the knife and grinder in motion.

The grinder-shaft m is supported principally in the bracket n, attached to the knife-bracket, as at o, insuring that both move in unison when adjusted with respect to their inclination, and the grinder-shaft is provided with a pulley p, which may be driven by a belt passing thereover and over a pulley q on the counter-shaft.

Instead of connecting the grinder with the knife-bracket I may make it independent thereof, as is shown in Figs. 2, 5, and 6, which show the grinder mounted on a stud r, adjustable in its support and the latter adjustable on an arm s, which carries the said support. The stud r is provided on its lower end with a pulley t, which may be driven by a belt passing around it, double pulleys u, double pulleys v, and a pulley w on the counter-shaft d. The arm s is pivoted upon the frame, as at x, (see Fig. 2,) so that when not in use it may be swung back under the frame and out of the way, and when so swung back the belts for driving the grinder will be slackened to such an extent as to stop the rotation of the grinder. This operation occurs from the fact that the pulleys u are supported by the arm s on a stud which moves concentric with the pivotal stud x, on which the said arm is pivoted. When the arm s is swung outward to bring the grinder into operative position with relation to the knife, the belts will be tightened upon their pulleys, and when swung inward out of the way the said belts will be slackened, so that they will not operate to drive the grinder. It will be observed that the relationship between the pivotal axis of the supporting-arm s and the plane of the rotary grinder and the rotary knife is such that as the grinder is swung away from or against the knife there is no change in its inclination relative to the plane of the skiving-knife. This is an important feature, since no matter how small the knife may become worn, thereby making it necessary to swing the grinder through a longer arc than when the knife is full size, the inclination of the grinder to the knife is not affected as it would be if the movement of the pivoted arm toward or away from the cutting-knife caused any variation in the inclination of the grinder and its axis. Moreover, by this construction the grinder is moved bodily away from the vicinity of the knife, so as to leave the space about the knife clear and unobstructed. In Fig. 6, for the sake of avoiding confusion, only the pulley t on the lower end of the stud or shaft r is shown as the means for operating the grinder. It will be understood with reference to this figure that when the grinder is in fully-operative position it will be inclinedly adjusted on the arm s, so as to bring its surface into contact with the edge of the blade.

I am aware that a readily-operated thumb-screw for operating the knife-bracket to tilt or incline the knife and the provision of means for connecting the grinder-shaft bracket with the knife-shaft bracket, so that both may be adjusted in unison, have been contrived and application for a patent therefor made by Charles H. Bayley, of Boston, and hence do not herein claim such means broadly.

As heretofore, in order to properly feed the material to be skived to the knife, I employ a feed-roll, a coöperating feed-disk partly overhanging its outer edge, an edge-gage overhanging its inner edge, and a horizontal presser-finger projecting over the surface of the roll beyond the edge-gage. I have, however, introduced a novel feature by mounting said presser-finger so that however much it is lifted from the surface of the feed-roll in order to accommodate different thicknesses of leather both ends have the same extent of movement away from the surface of the feed-roll, so that the pressure exerted upon the leather by the outer end is just the same as the pressure exerted at the inner end and at all intermediate points when the finger is in any given position. This is an important feature, since heretofore in this class of machines the horizontal presser-finger has been so mounted that the outer end was raised more than the inner end, so that as the finger was raised little or no pressure was exerted upon the leather at the outer end. I have shown in Figs. 1 and 2 of the drawings one mode of carrying this idea into effect. As therein shown, the presser finger or bar v is supported by a suitable part of the machine from the same side of the feed-roll as the edge-gage and projects out beyond said edge-gage over the feed-roll, so as to hold down the stock in place upon the surface of the roll, it being assisted in this function by the tension-spring z, whose action is regulated by the tension-adjusting screw a'. The presser-finger has at its rear end an angular extension or arm b', which is pivotally connected with a part of the machine. In this instance both the edge-gage and the presser-finger are shown mounted upon the sliding frame g, so that they are movable in unison therewith. A spring c', secured at one end to the pivoted stud d' and at its other end to the presser-finger, serves to press the finger down toward the roll. It will be observed that the movement of the finger to or from the roll is not accompanied by any longitudinal tilting or inclination of said finger with relation to the surface of the roll, since from end to end of the operative portion of the finger all points have an equal degree of movement from the roll, and hence the finger when in any given position exerts a uniform pressure upon the leather throughout its length, as explained above. In the form of construction shown in the drawings this effect is due to the fact that the pivotal axis of the presser-finger is parallel to the axis of the feed-roll; but the essential thing is that the upward movement of the finger from the feed-roll shall not be accompanied by any disturbance in a longitudinal direction of the parallelism between the finger and the feed-roll surface, thereby securing a uniform pressure upon the leather at all points along the operative portion of the presser-finger.

As before stated, such parts of the machine as have not been changed in making my improvements, and the functions of which are well understood by leather-working artisans, have not been described in detail because it has been thought unnecessary.

Having thus explained the nature of the invention and described a way of constructing and using the same, though without attempting to set forth all of the forms in which it may be made or all of the modes of its use, it is declared that what is claimed is—

1. In a leather-skiving machine, the pivoted knife-carrying bracket, combined with a screw pivoted at one end to said bracket, a relatively-fixed part of the machine, and a thumb-nut having a bearing in the latter and engaging said screw.

2. The combination, with the pivoted knife-carrying bracket and the framework of the machine, of a horizontally-arranged screw pivoted to the bracket, and a thumb-nut having a bearing in the framework and adapted to engage the said screw.

3. In a leather-skiving machine, the combination, with the framework of the machine, of an arm pivoted to swing toward and away from the cutting-knife, a rotary grinder carried by said arm and movable with it against or away from the cutting-knife, an idler-pulley rotatably mounted near the pivotal point of said arm, and a pulley mounted on the rotary grinder-shaft in position to receive a belt passed from said idler-pulley.

4. In a leather-skiving machine, the combination, with the framework, of a rotary knife, a rotary grinder mounted on a supporting-arm, said arm being pivotally connected with the framework to carry said grinder bodily toward or away from said knife without varying the inclination of said grinder with relation to the plane of said knife, substantially as described.

5. In a leather-skiving machine, the combination, with a rotary knife, of a rotary grinder mounted on and carried by a movable arm, said arm being pivoted upon a vertical axis, whereby the tilting of the grinder with reference to the horizontal plane is avoided.

6. In a skiving-machine, the combination, with the framework, of an arm pivoted to swing in a horizontal plane toward and away from the skiving-knife, a rotary grinder carried by said arm, and independent means for varying the inclination of the grinder with relation to the plane of the skiving-knife, substantially as described.

7. The combination, with the feed-roll, of the pivoted presser-finger, and a tension-spring for normally pressing the same downward bodily, whereby when the presser-finger is raised it will be raised on a line parallel with the surface of the feed-roll.

8. The combination, with the frame of the machine and the feed-roll, of the presser-finger having an angular part pivoted to the frame, and a tension-spring for pressing the presser-finger down bodily.

9. In a skiving-machine, the combination, with the feed-roll, of a presser-finger pivoted to move about an axis substantially parallel with the axis of the feed-roll and means for yieldingly pressing the presser-finger toward the surface of the feed-roll, substantially as described.

10. In a skiving-machine, the combination, with the feed-roll arranged to rotate about a horizontal axis, a presser-finger pivoted upon a horizontal axis lying outside of the vertical plane of the feed-roll axis, whereby the pivotal movement of the presser-finger does not disturb the longitudinal parallelism between the operative part of the presser-finger and the surface of the feed-roll.

11. In a skiving-machine the combination of the cylindrical feed-roll, the feed-disk, the edge-gage and the overhanging presser-finger movable in unison, said presser-finger having also an independent upward movement from the feed-roll without disturbing its longitudinal parallelism to the feed-roll surface.

12. In a skiving-machine the combination with a feed-roll, of a feed-disk partly overhanging one edge thereof, an edge-gage overhanging the other edge thereof, and a presser-finger projecting horizontally beyond said edge-gage and longitudinally of the roll, said presser-finger having a yielding movement away from the roll without tilting longitudinally with relation to the surface of the roll, whereby the finger is caused to exert a uniform pressure throughout the length of its operative portion, substantially as described.

In testimony whereof I have signed my name to this specification, in the presence of two subscribing witnesses, this 28th day of July, A. D. 1898.

BENJAMIN F. DUNHAM.

Witnesses:
HERBERT H. CHASE,
MARIA P. DUNHAM.